(12) United States Patent
Zell

(10) Patent No.: US 7,012,642 B1
(45) Date of Patent: Mar. 14, 2006

(54) METHOD FOR ADJUSTING DIGITAL IMAGES TO COMPENSATE FOR DEFECTS ON FILM MATERIAL

(75) Inventor: Joachim Zell, Lorch (DE)

(73) Assignee: Pandora International Limited, (GB)

( * ) Notice: Subject to any disclaimer, the term of this patent is extended or adjusted under 35 U.S.C. 154(b) by 873 days.

(21) Appl. No.: 09/657,893

(22) Filed: Sep. 8, 2000

(30) Foreign Application Priority Data

Sep. 9, 1999 (GB) .................................... 9921331

(51) Int. Cl.
*H04N 9/47* (2006.01)
*H04N 5/253* (2006.01)
*H04N 9/64* (2006.01)

(52) U.S. Cl. .......................... 348/246; 348/97; 348/96
(58) Field of Classification Search .................. 348/96, 348/97, 246
See application file for complete search history.

(56) References Cited

U.S. PATENT DOCUMENTS

| | | | | |
|---|---|---|---|---|
| 4,680,638 A | * | 7/1987 | Childs | 348/97 |
| 5,416,516 A | * | 5/1995 | Kameyama et al. | 348/246 |
| 5,526,040 A | * | 6/1996 | Foley | 348/97 |
| 5,589,887 A | * | 12/1996 | Wischermann | 348/616 |
| 5,805,207 A | * | 9/1998 | Watkinson et al. | 348/97 |
| 5,847,754 A | * | 12/1998 | Thornton | 348/97 |
| 5,987,187 A | | 11/1999 | Wischermann | 382/275 |
| 6,002,433 A | * | 12/1999 | Watanabe et al. | 348/246 |
| 6,208,382 B1 | * | 3/2001 | Glenn | 348/448 |
| 6,421,079 B1 | * | 7/2002 | Truc et al. | 348/96 |
| 6,642,960 B1 | * | 11/2003 | Kohashi et al. | 348/246 |
| 6,704,045 B1 | * | 3/2004 | Brett | 348/222.1 |

FOREIGN PATENT DOCUMENTS

| | | |
|---|---|---|
| DE | 19636864 C1 | 9/1996 |
| DE | 419635544 | 3/1998 |
| EP | 30104019 A | 3/1984 |
| GB | 22139039 A | 10/1984 |
| GB | 2317296 A | 3/1998 |
| GB | 12333413 A | 7/1999 |

OTHER PUBLICATIONS

International Search Report dated Mar. 13, 2001, for GB 022203.4.
UK Patents Act 1977: Search Report under Section 17(6) dated Nov. 12, 2001.

* cited by examiner

*Primary Examiner*—Thai Tran
*Assistant Examiner*—James M. Hannett
(74) *Attorney, Agent, or Firm*—McDonnell Boehnen Hulbert & Berghoff LLP

(57) ABSTRACT

A method of scanning frames of cinematographic film to generate digital values of pixels constituting images on the film frames is provided in which pixels corresponding to defects on the film are identified and the values of such pixels are adjusted to compensate for the defects, the identification of the pixels corresponding to defects on the film being carried out by identifying pixels whose value is beyond a predetermined threshold.

A method of correcting for flicker in digital images obtained by scanning cinematographic film is also provided. This method comprises the steps of identifying frames in which flicker is present; identifying relatively bright regions in those frames whose brightness is above a predetermined level, and correcting digital pixels in those relatively bright regions so as to compensate for the effect of flicker.

12 Claims, 3 Drawing Sheets

= DETECTED AS DIRT

X = NEIGHBOUR OF DIRT

METHOD FOR ADJUSTING DIGITAL IMAGES TO COMPENSATE FOR DEFECTS ON FILM MATERIAL

INTRODUCTION

The present invention relates to the conversion of images stored on cinematographic film to corresponding electrical signals. More particularly, the invention relates to methods of modifying the electrical signals so as to compensate for degradation of the cinematographic film.

Cinematographic film has now been in existence for over one hundred years. There is a wealth of history and entertainment in existence on this medium, in nearly every country in the world. However, photographic film degrades with age. Thus, there is a need for methods to counteract damage done to the film by the passage of time, damage caused by bad storage or careless handling, and so forth.

BRIEF DESCRIPTION OF THE PRIOR ART

Methods of correcting for fading in film are known in the art. For example, U.S. Pat. No. 5,212,518 in the name of Yamatoya & Co., Ltd. describes a method in which the unfaded values of pixels in a digital image obtained from film are estimated by assuming a level of dye loss for the film such that the faded pixels in the image can be replaced by pixels having an estimated value corresponding to the unfaded image. U.S. Pat. No. 5,796,874 also relates to a method of restoring faded images using a mathematical model to represent the fading. However, these documents only address the general concept of correcting the image for fading of the film.

However, visual defects in cinematographic film also occur due to defects on the film such as scratches and dirt. Such defects, unlike film fading, are not uniform across each frame of film and so must be corrected in a different manner.

Scratches in cinematographic film are usually caused by hard particulate matter being in contact with the soft film emulsion or the relatively soft film backing. This can occur if the hard particulate matter is embedded in the film transport rollers, or if it gets between layers of the film. Thus, the scratches are formed in the film transport direction, which in all but a small number of specialist large format materials corresponds to a longitudinal direction with respect to the film frame. Two sorts of scratch can occur, namely 'black' or 'white' scratches. If emulsion is removed from negative film material, the scratch on resulting projected positive material will be a 'black' scratch. If emulsion is removed from a positive material, the overall result when viewed on a projection screen will be white. This is because negative film is never projected as such, but contact printed into positive material for viewing. In the case of colour film, the film material will have three emulsion layers, and any or all of these layers can be 'scratched'. Scratches normally extend over a number of film frames.

Defects also appear on film from dirt which has built up on the film surface. It is inevitable that old film material will get dirt particles attached to it. Whilst there are many film cleaning techniques, they are never perfect, and dirt is always present to some degree or another in old film material. Usually, a particular dirt defect will be present on only one film frame. The defect may be a "white" defect or a "black" defect.

SUMMARY OF THE INVENTION

According to an invention disclosed herein, there is provided a method of scanning frames of cinematographic film to generate digital values of pixels constituting images on the film frames, wherein pixels corresponding to defects on the film are identified and the values of such pixels are adjusted to compensate for the defects, the identification of the pixels corresponding to defects on the film being carried out by identifying pixels whose value is beyond a predetermined threshold.

Thus a maximum and/or minimum threshold value may be set. For example, if the range of values for pixels is 0 to 255 representing pure black to pure white, then an upper threshold could be 245 to identify "white" defects and a lower threshold could be 10 to identify "black" defects.

Such thresholds may not always be sufficient to distinguish defects from picture material. Furthermore, it is desirable to distinguish between defects which are scratches and defects which are dirt because it is desirable to correct them in different ways.

One way of determining whether a pixel whose value is beyond a threshold is part of a scratch, is to determine whether there are other pixels having a value beyond the threshold which are generally aligned with that pixel in the direction of film transport. If one envisages a column a few pixels wide on a film frame, extending in the direction of film transport, a longitudinal series of pixels in this column which are beyond the threshold is indicative that there is a scratch. A scratch correction technique can then be used.

One way of determining whether a pixel whose value is beyond a threshold is part of a dirt defect, is to determine whether the corresponding pixel in a preceding or subsequent frame is also beyond the threshold. Dirt defects are usually restricted to a single frame, and if the corresponding pixel on adjacent frames is not beyond the threshold then a dirt defect is indicated and a suitable correction technique can be used. If the corresponding pixels on adjacent frames are also beyond the threshold, then it indicates that the defect may be a scratch or that there may be no defect at all and the value arises from genuine picture content.

Alternatively, the value of the corresponding pixel in a preceding or subsequent frame may be compared with the value of the pixel whose value is beyond a threshold. If the corresponding pixel values on adjacent frames are different from the pixel by more than a predetermined threshold (in a range of 20 to 30, typically of value 24), then the pixel is treated as being dirt.

The detection of defects may be carried out solely using the steps outlined above, with entire frames being analysed for pixels beyond the threshold. Alternatively, and particularly in the case of scratches, there may be a preliminary manual step to identify one or more pixels in a scratch. An operator could for example position a cursor on a scratch on a viewing monitor. The method of the invention will then be used to identify the remaining pixels corresponding to the scratch by looking only in a column of a chosen width in the frame concerned, and in subsequent frames, on the basis that the scratch will extend generally in the direction of film transport. This will reduce time as it will not be necessary to analyse each pixel in each frame. Where an operator discerns that there are relatively few scratches on a film, this may be the most efficient way of proceeding. If there are many scratches then it may be better to analyse all pixels and to perform the operation completely automatically.

The correction of defects may be carried out by replacing the pixel values by values obtained from pixels adjacent the defect. In the case of a scratch, these would be the values of pixels on either side of the scratch. Thus the digital value with which each identified pixel is replaced is obtained by interpolation along the lateral line of the image in which the pixel to be replaced is located. In the case of a dirt defect, interpolation could be done in a similar manner, using pixels in any chosen direction adjacent the defect. However, preferably correction of pixels in dirt defects is carried out by interpolation using the values of the corresponding pixel in the preceding and subsequent frame. This is because dirt defects are usually restricted to a single frame.

A further characteristic of dirt defects is that they may not have as sharp edges as scratch defects. It may therefore be necessary to identify pixels surrounding the pixel or pixels beyond the threshold, which are not themselves beyond the threshold but represent the "grey" edge of the dirt defect. These would then also be corrected.

When scratch correction is to be carried out using interpolation from the values of pixels either side of the scratch, a problem is that there is an increased chance of the correction being visible if the scratch is greater than a certain width. The result may not be as objectionable as a scratch but it is undesirable. Thus in a preferred embodiment of the present invention a novel method of scratch correction is carried out, and this is inventive in its own right regardless of the method of scratch detection.

Thus, an invention disclosed herein provides a method of scanning frames of cinematographic film to generate digital values of pixels constituting images on the film frames, in which pixels corresponding to a scratch defect on a film frame are identified and the values of such pixels are adjusted to compensate for the defect, wherein if the width of the scratch exceeds a predetermined number of pixels, at least one column of pixels from within the scratch defect is removed, image pixels outside the scratch defect are moved in to compensate for the removed pixels, and the remaining pixels within the scratch defect are corrected by using values interpolated from pixels on either side of the scratch.

A further problem with cinematographic film is flicker. There are many sources of flicker. Commonly this is caused by the beating between the commonly used indoor lights (Halogen Mercury lights, or 'HMI') and the camera shutter. Flicker may also be produced by variations in the film transport in continuous motion film development baths. Thus, it has been realised that there are several types of flicker, each of which needs a different correction mechanism. Lamp flicker causes a variation in colour temperature, which therefore selectively affects the colour balance of the film material. This will need differential correction in red green and blue to restore it. Camera shutter flicker affects the overall light level. This can therefore be corrected by processing the red, green and blue values together. Film processing errors can cause either light level variations, which can be corrected as in the camera shutter problems, or colour balance shifts, and therefore require differential shifts in each colour. In accordance with a further invention disclosed herein it is possible to correct for each of these types of flicker.

Thus, in accordance with this invention there is provided a method of correcting for flicker in digital images obtained by scanning frames of cinematographic film, comprising the steps of: identifying frames in which flicker is present; identifying relatively bright regions in those frames whose brightness is above a predetermined level, and correcting digital pixels in those relatively bright regions so as to compensate for the effect of flicker.

Thus if digital pixel values range from 0 (black) to 255 (white) then the threshold for relatively bright regions may be set at between 90 and 100, 96 in a preferred embodiment, and only pixels in these regions will be subject to flicker adjustment.

Flicker may be identified in the standard manner. Thus, an operator will play back a sequence of digital images obtained from scanning the frames of cinematographic film and the flicker will be visible to him due to the variation in light level of the frames. The operator then selects those images (typically corresponding to about one in every three or four frames) which have a noticeably lower light level as the images requiring flicker correction.

Preferably, the relatively bright regions of a frame in which flicker is present are separated into those containing objects which are stationary as regards a sequence of frames, and those which move during the sequence of frames. The values of pixels in regions representing a stationary object are replaced by values obtained by interpolation between the corresponding pixels in the previous and subsequent frame. The pixels in regions representing a moving object are rescaled using a constant derived from the ratio of the average brightness of the moving object in the images in which flicker is not present to those in which flicker is present.

The present invention also extends to systems, apparatus and software for carrying out the methods described above, and to recorded images which have had defects and/or flicker corrected using the methods described. Some aspects of the correction of defects may also be applicable to still photographic images.

BRIEF DESCRIPTION OF THE DRAWINGS

Preferred embodiments of the invention will now be described, by way of example only, and with reference to the accompanying drawings in which.

DESCRIPTION OF THE PREFERRED EMBODIMENTS

Figure 1A:
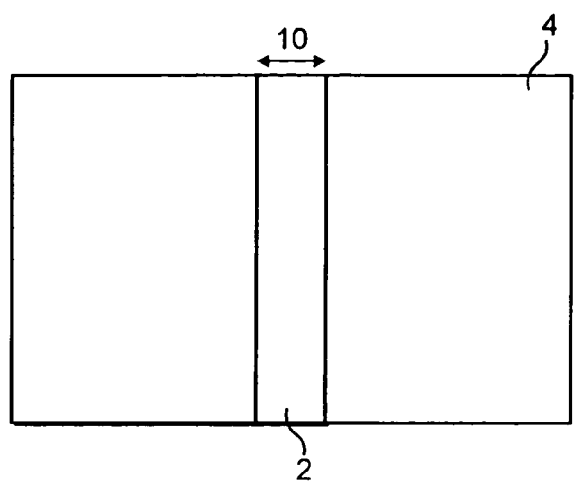
FIGS. 1a to 1c show scratch correction of a digital image according to one embodiment of the invention.

In a first embodiment of the invention, an operator manually enters the position of a pixel in a scratch on one frame. To do this, the operator will have positioned the cursor on a scratched pixel.

The pixel values are analysed under the assumption that 'white' scratches will have (in an 8 bit quantisation) values above a maximum threshold. This threshold can be varied, but typically will be value 245. Similarly, 'black' scratches will be below a variable minimum threshold. This threshold will typically be 10. Thus firstly, the user determines the mode of material that he wishes to scratch correct from positive or negative, which then chooses which threshold is used for scratch detection.

Scratches usually will contain continuous positional information. Thus a scratched pixel is highly likely to have another scratched pixel next to it. A two stage identification for scratches is therefore provided. It is possible to look at the neighbours of the manually identified scratch position, and apply the threshold, and decide whether they are scratched or not. The scratched pixels are stored as a list of (x,y) co-ordinates.

In an alternative embodiment, scratches are identified without manual intervention. This is because it is possible to threshold the entire image with the threshold values, and identify all the potentially scratched pixels in the image. Any such pixels whose neighbours also have a value beyond the threshold will be identified as part of a scratch. This automatic detection mode can be used 'stand alone' or as an addition to the manual scratch identification system.

In a further extension to the above (which describes the case of monochrome material) it is possible to detect scratches in coloured material. This material will have three emulsion layers. Any or all of these layers can be 'scratched'. Therefore, after choosing the material (positive or negative) each of the pixels is tested independently for 'scratch' thresholding in Red, Green, and Blue. It is possible to choose different thresholds in each colour if desired. In the 'colour' case lists of (x,y) addresses of scratched pixels in each of the red, green, and blue images are obtained.

To correct the detected pixels corresponding to the scratches on the film, lateral interpolation is used. This works well, as the scratch direction, as explained earlier is predominantly longitudinal. Note that in the colour system, it is necessary to 'repair' each layer independently, by interpolating for scratched blue pixels in the blue layer, for scratched red pixels in the red layer, and similarly for the green layer.

The interpolated values for replacing scratched pixels are obtained using the following equation where N is the width of a scratch in a number of pixels, $p_n$ is the nth pixel in the scratch, $p_l$ is the pixel immediately to the left of the scratch and $p_r$ is the pixel immediately to the right of the scratch:

$$p_n = ((1-n)/N) \times P_l + (n/N) \times p_r$$

Alternatively, more complex interpolations such as those described in chapter 4.3.2 at pages 113 and 114 of "Digital Image Processing" by W K Pratt, published by Wiley Interscience, ISBN 0-471-01888-0 can be used.

Figure 1B:
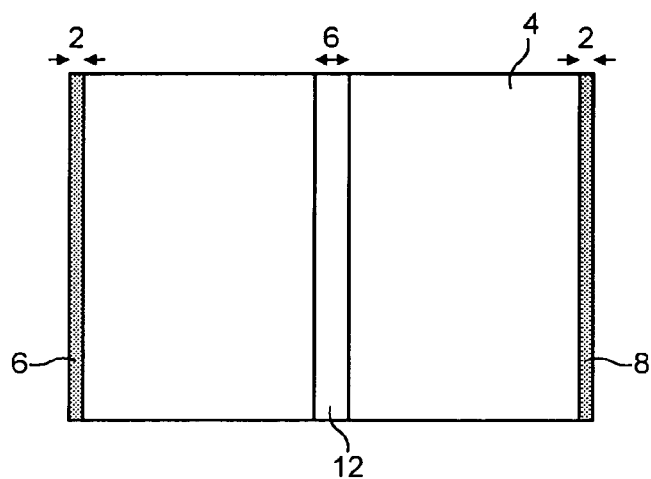
Figure 1C:
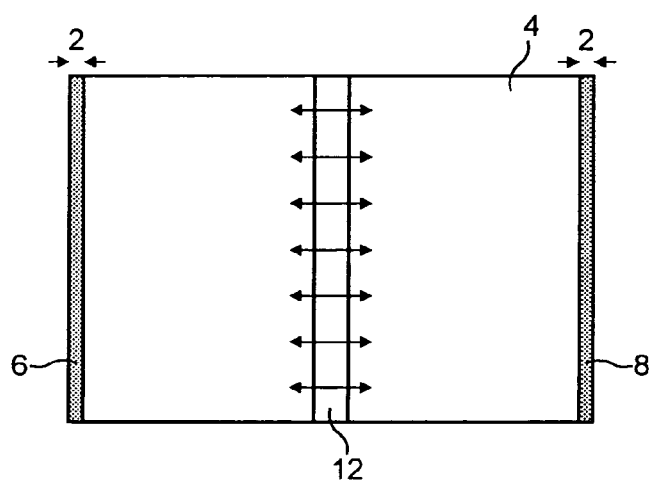

In an improvement to the embodiment described above, as shown in FIGS. 1a to 1c, if the scratch width is greater than a certain threshold (typically 6 pixels at normal broadcast resolution, or 10 pixels at high definition), interpolation across the scratch will produce noticeable defects. Whilst these defects may not be as annoying as scratches, another algorithm is used to produce more preferable results. If it is decided that the scratch is greater than the threshold width then the two portions of the image (the parts either side of the scratch) are moved laterally by an amount so as to approximately halve the remaining scratch width. Thus if the scratch is 10 pixels wide, the left hand part of the picture is moved 3 pixels to the right, and the right hand half of the picture is moved 3 pixels to the left. The column (3 pixels wide) on the far left of the image will then contain no picture information and so is filled with 'blanking' values (typically 0), and correspondingly with the column on the right hand side of the picture. Thus the picture width 'shrinks' slightly where scratches are removed, but this is not easily detectable. The residual column in the centre of the picture (now 4 pixels wide) is then filled as if it were a conventional scratch, as described earlier.

In a further case, where the scratch is less than the threshold, it may be desirable to add some noise to the interpolated new pixels. It is preferable to sample noise from the actual lateral picture line that pixels to be replaced are located in. Thus, a region of consecutive pixels, typically 20 pixels long, that has a maximum amplitude around a mean of typically + or −5 pixels is taken from the lateral line. This amplitude is stored as a noise signal such that the first value of the noise buffer is read to add (or subtract) to the first interpolated value in the scratch region and so on. Because this procedure is carried out on a line by line basis, there is no structured noise visible, as there would be if the noise were only calculated from one line.

There may however be a case where no region is found along a lateral line which meets the criteria (+ or −5 pixels variation). In that case, noise can be generated from a mathematical model of a random noise generator, scaled to a user defined range. Programming languages such as FORTRAN offer the facility to generate scaled random numbers, and many computer operating systems provide subroutines for doing this. Alternatively, mathematical routines such as starting with a defined 8 bit number and squaring it, which will result in a 16 bit number, and extracting the middle eight digits from the 16 will result in a random sequence. Having generated the number, and scaled it by a multiplier typically of 4, these values can be added and subtracted to the interpolated pixels. It is also sometimes desirable to add this noise either side of the join of pixels in the image shifting case above.

Figure 2:
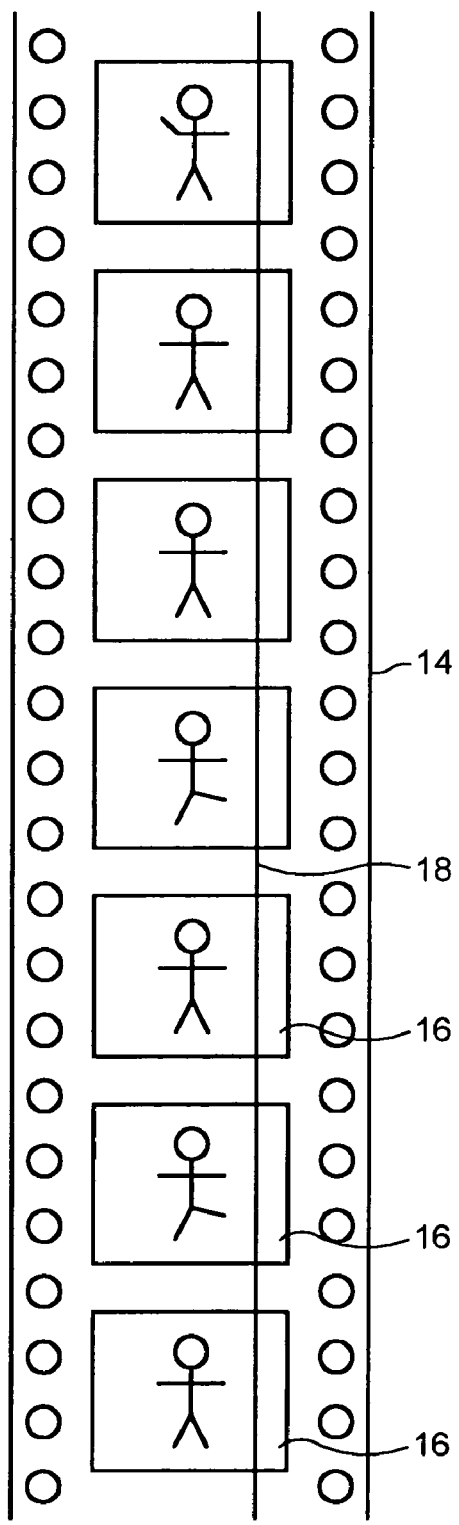
FIG. 2 shows a strip of cinematographic film with a substantially vertical scratch running through several frames of the film.

A further implementation of the above involves dynamic scratch detection. Because of the nature of motion picture film, the scratches are vertical relative to the film frames, or nearly vertical. Thus if a scratch is indicated by an operator starting in column x of a film frame, there is a high probability of finding the scratch in the next film frame also on column x. This is shown in FIG. 2. It is better to look in column x plus or minus a threshold, typically 5 columns either way. This allows for scratches to be nearly vertical, as opposed to vertical. This detection method from frame to frame allows better detection between real scratches and vertical picture information, such as doorways etc. It is found preferable to alternate search directions for the scratch from frame to frame. For example, x, x+1, x−1, x+2, x−2, x+3, etc, rather than x. x+1, x+2, x+3, then x−1, x−2, x−3.

The principle used to track scratches described above has wider applications in the field of tracking moving objects. In post production it is desirable to create masks. These masks are generally user defined areas in which it is desired to change the colour or appearance attributes differently to those for other parts of the scene. These masks can be defined by various methods, either by the user drawing the mask on a monitor screen displaying a digital image or by identification as an object as described in UK patent application No. 2317298 A, and the creation of a mask thereof. These masks are often referred to as 'megashapes'. It is desirable to be able to track these shapes from frame to frame. For example, this shape may be drawn on frame 1 around a football, and it is necessary to track this football in the subsequent 20 frames.

To track such an object where it moves in both the x and y directions, the principles described above can be applied. Instead of looking for a luminance change with a defined level as for the scratch, a high contrast point in the moving object is defined (for example, this could be thee eye of a moving person or a mirror of a driving car). This object from the first frame in the series will be cut out as a 6×6 pixel puzzle and saved in a reference frame store. This reference frame store could be either in the telecine system, or within the colour corrector system, such as a Pandora Pogle Platinum.

The same puzzle piece is then looked for in the next frame in the same position. If the puzzle is not found in the same position then it is necessary to draw circles around this position to find the puzzle. In this case it is important to allow for a change in both luminance and chrominance as well as the form of the object as it is possible that the object may be turning around or changing direction.

Thus, the method is: check puzzle of frame 1, with the part of the picture in the same position in frame 2. If there is no match, allow a change of luminance and chrominance. If there is still no match, check a new position with the original luminance and chrominance level. If there is still no match, allow a change of chrominance and luminance, and so on. Further, a new match will always overwrite the originally stored reference puzzle.

A further embodiment of the invention provides a method for restoring film due to degradation from dirt which has built up on the film surface. It is inevitable that old film material will get dirt particles attached to it. Whilst there are many film cleaning techniques, they are never perfect, and dirt is always present to some degree or another in old film material. It is possible to detect dirt because of the fact that it will not be present on consecutive film frames. Therefore initially, the second frame of a motion picture sequence is analysed to test for dirt. Pixels in the digital image corresponding to this film frame are identified by comparing the pixel value with the upper threshold (white dirt) and lower threshold (black dirt). Typically these thresholds are 245 and 10 respectively, but can be changed under operator control. The (x,y) addresses of the pixels that fall outside of the range between the upper and lower thresholds are then stored in a list. For each of the pixels on the list, the pixel values on the previous frame (frame 1) and the following frame (frame 3) are compared to the value in frame 2. Only if the pixel is seen to be dirt on frame 2, i.e. to be outside of the range between the upper and lower thresholds, and not on frames 1 and 3 is the pixel identified as actually corresponding to dirt on the film. This is because if the pixel is identified as corresponding to dirt in the same place in more than one frame, then it is probably picture detail.

Having decided, for example, that the pixel at frame 2, address (x,y) does correspond to dirt, it is necessary to correct it. This is done by temporal interpolation. Thus the pixel value of this frame is replaced with the interpolated value from pixel (x,y) on frame 1 and pixel (x,y) on frame 3.

Figure 3:
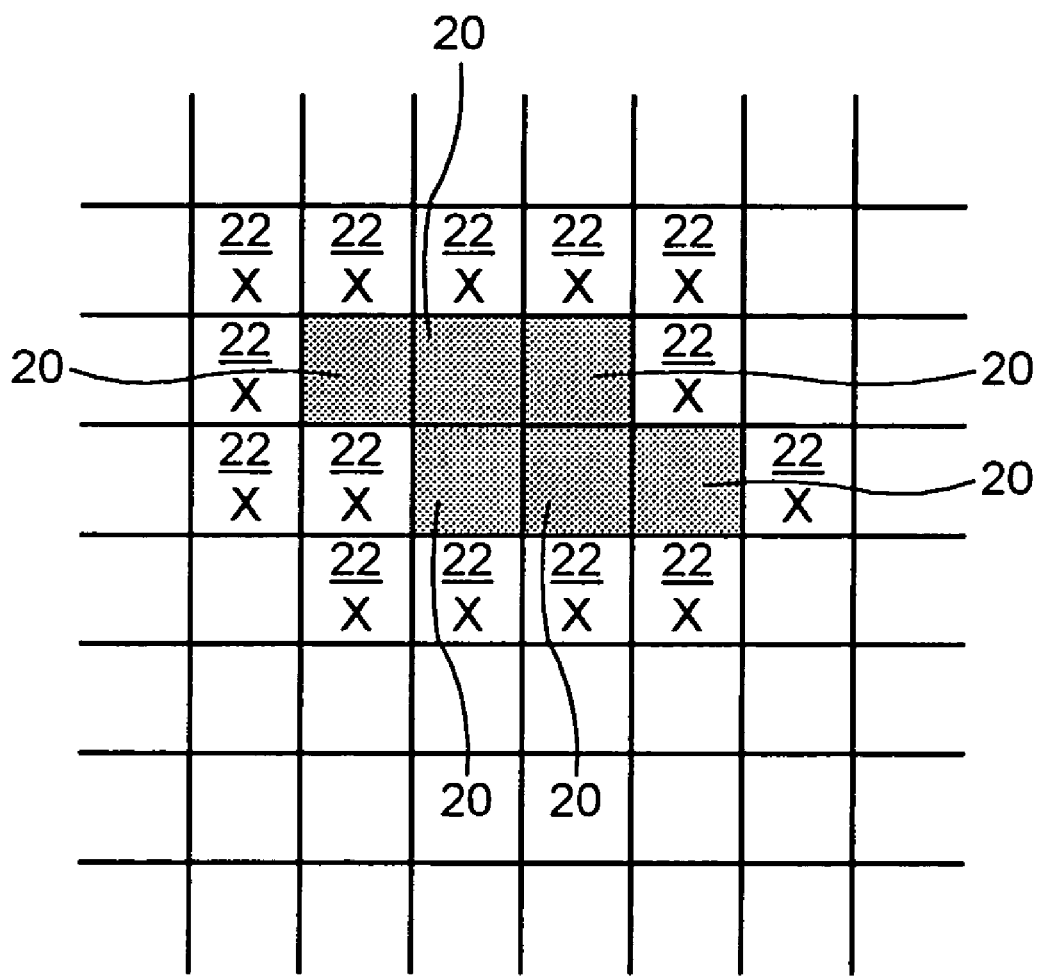
FIG. 3 shows schematically an embodiment of the invention in which pixels surrounding pixels identified as corresponding to dirt on the film are also treated as corresponding to dirt on the screen.

In a further improvement of the dirt removal system, it has been realised that dirt particles are not usually sharp, but have grey edges. Thus, as shown in FIG. 3, for genuinely detected pixels corresponding to dirt particles on the film, a neighbouring region of width typically one pixel around the pixels identified as corresponding to dirt on the film is defined such that the pixels in this neighbouring region are also treated as corresponding to dirt on the film when correcting the digital image.

A third source of degradation in motion picture film is flicker.

Flicker is identified in the standard manner. Therefore, an operator will play back a sequence of digital images obtained from scanning the frames of cinematographic film and the flicker will be visible to him due to the variation in light level of the frames. The operator then selects those images (typically corresponding to about one in every three or four frames) which have a noticeably lower light level as the images requiring flicker correction.

According to one embodiment of the invention, the flicker is corrected for by segmenting each image into three regions. Firstly, dark picture regions (i.e. regions having pixels with an average value below a value of typically 96) do not exhibit a flicker effect. Thus, any such dark picture regions are ignored by the correction system. The segmentation of dark picture regions is carried out using known segmentation techniques in which local area averages of pixel values are obtained.

Regions above the dark threshold are further segmented into regions that show motion between consecutive frames, and those that are stationary. This can be done by temporal thresholding. If pixel (x,y) in frame t is compared to the value of pixel (x,y) in frame t+1 and t−1, and it is very similar numerically to the values of pixel (x,y) in frame t+1 and t−1 (i.e. the difference between the pixel values is less than about 24), then it is considered to be stationary. If it is not within a defined threshold, it is deemed to be in a region of motion.

An example of the segmentation of the images is given by consecutive frames showing a man in dark clothing in which his hand is moving across his body. In each consecutive frame, the dark clothing will be identified as being below the dark threshold and so will be ignored when correcting for flicker effects. The man's head and any light background will have a similar value in each image, i.e. the value will only vary by the amount caused by the flicker and so the system will identify these regions as being stationary. In contrast, in regions where the man's hand (which is light) has moved relative to the dark suit on a frame by frame basis, there will be a steep change in pixel values between light and dark. Thus, the region across which the man's hand is moving will be identified as a region of motion.

To correct for the flicker the stationary parts of the picture are treated differently to motion parts. For stationary parts flicker frames (or at least the non-dark parts of flicker frames) are replaced by an interpolated value between frame t−1 and t+1. For motion parts this is not possible as the picture would smear if this were done. The pixel values for these regions are therefore rescaled according to the following formula $$\text{Pixel Out} = K \times (\text{Pixel in} - \text{Dark Threshold}) + \text{Dark threshold}$$

Where the dark threshold will typically be value 96 as discussed above.

The constant K from the above is equation is determined from the equation:

$$K = B_u / B_f$$

where $B_u$ is the average brightness of an object in the image in which no flicker is visible and $B_f$ is the average brightness of the object in an image exhibiting flicker.

It will be appreciated that the embodiments described above relate to preferred embodiments only of the invention and do not in any way limit the scope of the invention as described above.

What is claimed is:

1. A method of scanning frames of cinematographic film to generate digital values within the visible range of pixels constituting images on the film frames, wherein pixels corresponding to defects on the film are identified and the digital values of such pixels are adjusted to compensate for the defects, the identification of the pixels corresponding to defects on the film being carried out by identifying pixels whose digital value is beyond a predetermined threshold, wherein the predetermined threshold is set at a maximum which is close to pure white and pixels whose value is higher than the maximum value are identified, and/or the predetermined threshold is set at a minimum value which is close to pure black and pixels whose value is lower than the minimum value are identified.

2. A method as claimed in claim 1, in which pixels which are generally aligned with an identified pixel in the direction of film transport are compared to the predetermined threshold and, if at least some of the said pixels have a value beyond the predetermined threshold, a defect corresponding to a scratch on the film is identified as including the generally aligned pixels having a value beyond the predetermined threshold.

3. A method as claimed in claim 1, in which a pixel in the preceding and/or subsequent frames corresponding to an identified pixel is compared to the predetermined threshold value and, if the pixel does not have a value beyond the predetermined threshold value in either the preceding or subsequent frame, the identified pixel is identified as corresponding to a dirt defect on the film.

4. A method as claimed in claim 1, in which the value of an identified pixel is compared to the value of the corresponding pixel in the preceding and/or subsequent frames and, if the difference between the value of the identified pixel and the value of the corresponding pixel in the preceding and/or subsequent frame is greater than a predetermined threshold, the identified pixel is identified as corresponding to a dirt defect on the film.

5. A method of scanning frames of cinematographic film to generate digital values of pixels constituting images on the film frames, wherein a pixel corresponding to a part of a scratch on the film is identified and the remaining pixels corresponding to the scratch in that frame are then identified by comparing only each of the pixels located in a column generally aligned with the identified pixel and extending in the direction of film transport to a predetermined threshold value and identifying those pixels having a value extending beyond the predetermined threshold value as constituting the remaining pixels.

6. A method as claimed in claim 5, wherein pixels corresponding to the scratch in subsequent frames of the film are identified by comparing each of the pixels in the column to a predetermined threshold value and identifying those pixels having a value extending beyond the predetermined threshold value as constituting the pixels corresponding to the scratch.

7. A method as claimed in claim 1, wherein the values of the identified pixels are replaced by values from pixels adjacent the defect.

8. A method as claimed in claim 1, wherein when the defect corresponds to a scratch on the film, the values of the identified pixels are replaced by values obtained by interpolation along the lateral line of the image in which the pixel to be replaced is located.

9. A method as claimed in claim 1, wherein when the defect corresponds to dirt on the film, the values of the identified pixels are replaced by values obtained from the values of the pixels corresponding to the identified pixels in the preceding and/or subsequent frames.

10. A method as claimed in claim 1, wherein when the defect corresponds to dirt on the film, pixels surrounding the one or more identified pixels which represent a blurred edge of the defect are identified and compensated for although the value of these pixels is not beyond the predetermined threshold.

11. A method as claimed in claim 1, wherein when the defect corresponds to a scratch on the film, if the width of the scratch exceeds a predetermined number of pixels, at least one column of pixels from within the scratch defect is removed, image pixels outside the scratch defect are moved in to compensate for the removed pixels, and the remaining pixels within the scratch defect are corrected by using values interpolated from pixels on either side of the scratch.

12. A method of scanning frames of cinematographic film to generate digital values of pixels constituting images on the film frames, in which pixels corresponding to a scratch defect on a film frame are identified and the values of such pixels are adjusted to compensate for the defect, wherein if the width of the scratch exceeds a width of 6 pixels at normal broadcast resolution or 10 pixels at high definition, at least one column of pixels from within the scratch defect is removed, image pixels outside the scratch defect are moved in to compensate for the removed pixels, and the remaining pixels within the scratch defect are corrected by using values interpolated from pixels on either side of the scratch.

* * * * *